US008229870B2

(12) United States Patent
Bagley et al.

(10) Patent No.: US 8,229,870 B2
(45) Date of Patent: Jul. 24, 2012

(54) CONSTRAINT BASED SYSTEM WITH DOMAIN SPLITTING

(75) Inventors: Claire M. Bagley, Carlisle, MA (US); Joyce Ng, Sunnyvale, CA (US); Gao Chen, Beijing (CN); Martin P. Plotkin, Concord, MA (US)

(73) Assignee: Oracle International Corporation, Redwood Shores, CA (US)

(*) Notice: Subject to any disclaimer, the term of this patent is extended or adjusted under 35 U.S.C. 154(b) by 623 days.

(21) Appl. No.: 12/431,096

(22) Filed: Apr. 28, 2009

(65) Prior Publication Data

US 2010/0274749 A1    Oct. 28, 2010

(51) Int. Cl.
     *G06F 15/18*    (2006.01)
     *G06F 7/60*    (2006.01)

(52) U.S. Cl. .............................. 706/19; 703/2

(58) Field of Classification Search .................. None
See application file for complete search history.

(56) References Cited

U.S. PATENT DOCUMENTS

| | | | | |
|---|---|---|---|---|
| 5,343,388 | A * | 8/1994 | Wedelin | 705/7.13 |
| 6,560,623 | B1 * | 5/2003 | Smith | 708/551 |
| 7,069,537 | B2 | 6/2006 | Lazarov | |
| 7,333,968 | B2 | 2/2008 | Geller et al. | |
| 7,594,176 | B1 * | 9/2009 | English | 715/708 |
| 2002/0107749 | A1 | 8/2002 | Leslie et al. | |
| 2002/0143653 | A1 | 10/2002 | DiLena et al. | |
| 2002/0166089 | A1 | 11/2002 | Noy | |
| 2004/0019852 | A1 | 1/2004 | Purvis | |
| 2005/0198621 | A1 | 9/2005 | Tillmann et al. | |
| 2005/0278271 | A1 | 12/2005 | Anthony et al. | |
| 2007/0094184 | A1 | 4/2007 | Emek et al. | |
| 2010/0111396 | A1 * | 5/2010 | Boucheron | 382/133 |

OTHER PUBLICATIONS

Frühwirth, Thom et al., "Principles of Constraint Systems and Constraint Solvers", Archives of Control Sciences: Special Issue on Constraint Programming, 16(2) http://www.informatik.uni-ulm.de/pm/mitarbeiter/fruehwirth/Papers/acs-systems3.pdf., 2006.
Lhomme, Olivier, "Consistency Techniques for Numeric CSPs", Proceedings in IJCAI-93 pp. 232-238, 1993 Chambery, France.
Selectica, "Selectica Configuration", Solution Overview, 2005, Selectica, Inc., San Jose, CA.
ILOG, "ILOG Configurator, Powering online product and service configuration applications", Product Datasheet, Mar. 2005, ILOG.S.A.
Oracle, "Oracle Configurator", Oracle Data Sheet, 2008, Oracle.
Tacton, "Tacton's Sales Configurator—Bridging the gap between engineering and sales for selling customized products." http://www.tacton.com/templates/page_68.aspx?epslanguage=EN, 2007, Tacton Systems AB, Sweden.
Benhamou, Frédérick et al., "Applying Interval Arithmetic to Real, Integer and Boolean Constraints", Journal of Logic Programming, 32(1), 1997.

(Continued)

*Primary Examiner* — Alan Chen
(74) *Attorney, Agent, or Firm* — Squire Sanders (US) LLP

(57) ABSTRACT

A solver for a constraint satisfaction problem includes a plurality of variables and a plurality of constraints. A floating point variable has a domain and is assigned a value by first determining if a predetermined value can be assigned to the floating point variable if the predetermined value is in the domain. If not, the solver determines if a bound of the domain can be assigned to the floating point variable. If the predetermined value can not be assigned to the floating point variable and the bound of the domain can not be assigned to the floating point variable, the solver assigns a value to the floating point variable using domain splitting.

18 Claims, 4 Drawing Sheets

OTHER PUBLICATIONS

Sabin, Daniel et al., "Configuration as Composite Constraint Satisfaction", Proceedings of the (1$^{st}$) Artificial Intelligence and Manufacturing Research Planning Workshop, 1996.

Ulrich Junker et al., "Preference programming: Advanced problem solving for configuration", pp. 13-29, 2002.

Narendra Jussien et al., "Dynamic domain splitting for numeric CSPS", pp. 225-227, 1998.

Fleischanderl, Gerhard et al., "Configuring Large Systems Using Generative Constraint Satisfaction", IEEE, pp. 59-68, No. 1094-7167/98, Jul./Aug. 2008, IEEE.

Mittal, Sanjay et al., "Dynamic Constraint Satisfaction Problems", Proceedings of the Eighth National Conference on Artifical Intelligence, 1996.

Stumptner, Markus et al., "Generative Constraint-Based Configuration of Large Technical Systems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

* cited by examiner

CONSTRAINT BASED SYSTEM WITH DOMAIN SPLITTING

FIELD OF THE INVENTION

One embodiment is directed generally to a computer system, and in particular to a constraint based computer system that solves constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an edge or "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

SUMMARY OF THE INVENTION

One embodiment is a solver for a constraint satisfaction problem that includes a plurality of variables and a plurality of constraints. A floating point variable has a domain and is assigned a value by first determining if a predetermined value can be assigned to the floating point variable if the predetermined value is in the domain. If not, the solver determines if a bound of the domain can be assigned to the floating point variable. If the predetermined value can not be assigned to the floating point variable and the bound of the domain can not be assigned to the floating point variable, the solver assigns a value to the floating point variable using domain splitting.

DETAILED DESCRIPTION

One embodiment is a constraint based system that determines a value for a floating point variable by assigning a value of 0 or by assigning a domain boundary value before performing domain splitting. Therefore, the value for the variable may be arrived at in a faster and more efficient manner.

Figure 1:
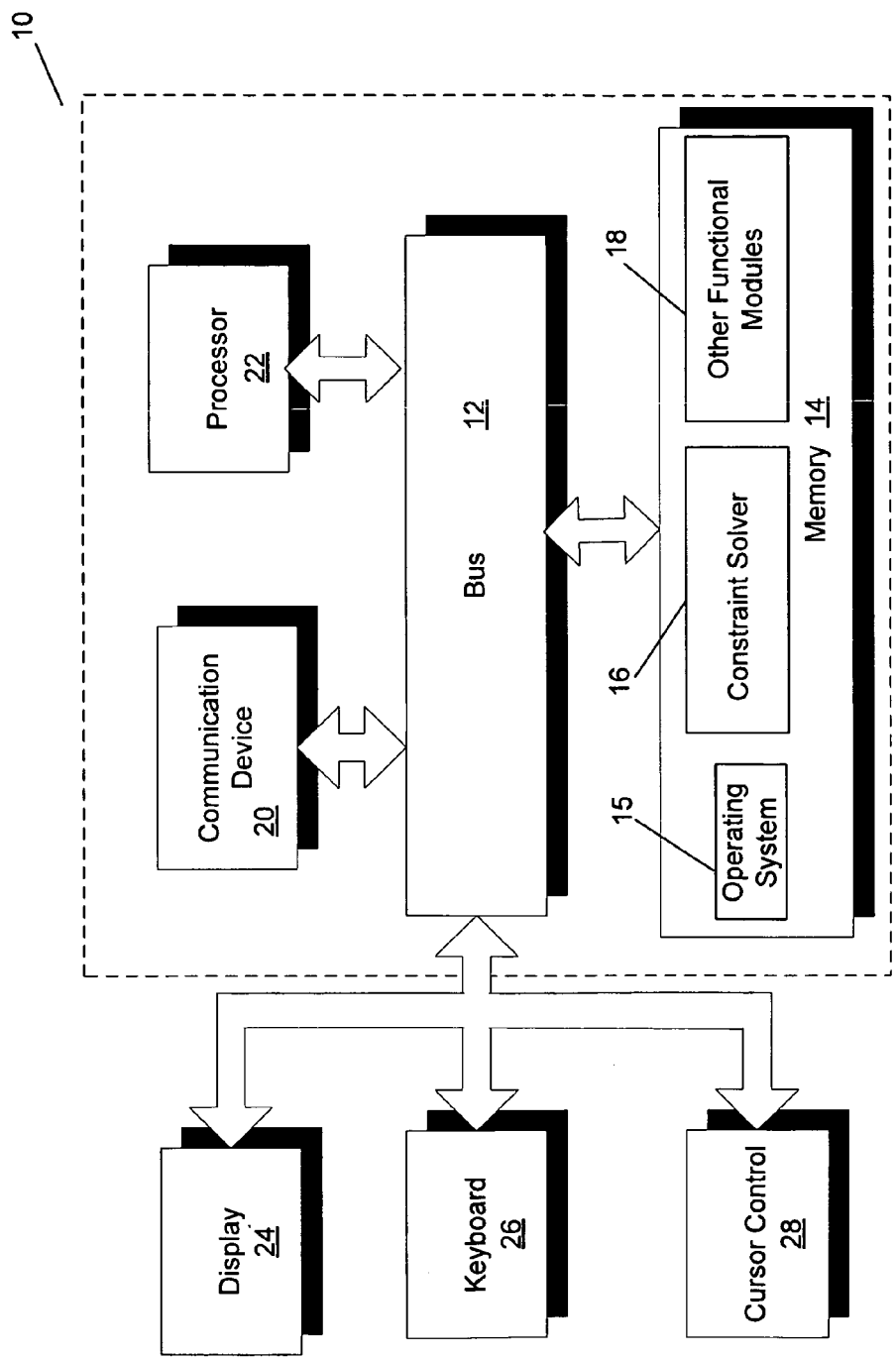
FIG. 1 is a block diagram of a constraint based system that can implement an embodiment of the present invention.

FIG. 1 is a block diagram of a constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a constraint solver module 16 that performs constraint solving with domain splitting as disclosed in more detail below. System 10 can be part of a larger system that includes a constraint solver such as a product configurator or artificial intelligence system. Therefore, system 10 will typically include one or more additional functional modules 18 to include the additional functionality.

In one embodiment, constraint solver 16 models problems as a network of a set of variables that each have a domain of possible values, and constraints that limit the value that the variables may take. Constraint solver 16 then solves the constraint problem. A solution to the problem is a state in which each variable has had its domain limited to a single value and no constraint has been violated. Constraint solver 16 acts to find one, or more, solutions to a given problem, or to prove that no solution exists.

Table 1 below provides examples of variables and domains, and Table 2 below provides examples of constraints.

TABLE 1

| Variable Name | Type | Domain |
| --- | --- | --- |
| A | Integer (enumerated) | {1, 2, 4, 5, 6} |
| B | Integer (interval) | [1 ... 5] |
| Weight | Float | [1.25 ... 10.50] |
| Choice | Boolean | {false, true} |
| Color | Set | {Black, Red, Silver, Blue} |

TABLE 2

A = B
Weight = Sum (contents.weight)
Choice Requires (Not (Color contains Black))

Constraint programming is a discipline that deals with the representation of a problem in a manner that allows for solutions to be formulated. A constraint problem is modeled as a set of variables that each has a domain of possible values. The relations and limitations between the variables are expressed as constraints. The constraints act to limit the value that a variable may take.

A search for a solution in a CSP involves value assignments to variables based on some heuristic ordering of its domain values. The efficiency of the search is therefore limited by the effectiveness of the domain value ordering. For floating point variables, a known method for domain value ordering is "domain splitting". Domain splitting, in general, involves dichotomic enumeration interleaved with filtering. The filtering is applied on the numeric CSP, the domain of a variable is split in two, and the two resulting numeric CSPs are explored separately by chronological backtracking. However, for floating point variables that include extremely large domains, domain splitting results in a large number of splits before the variable is assigned a single value.

Figure 2:
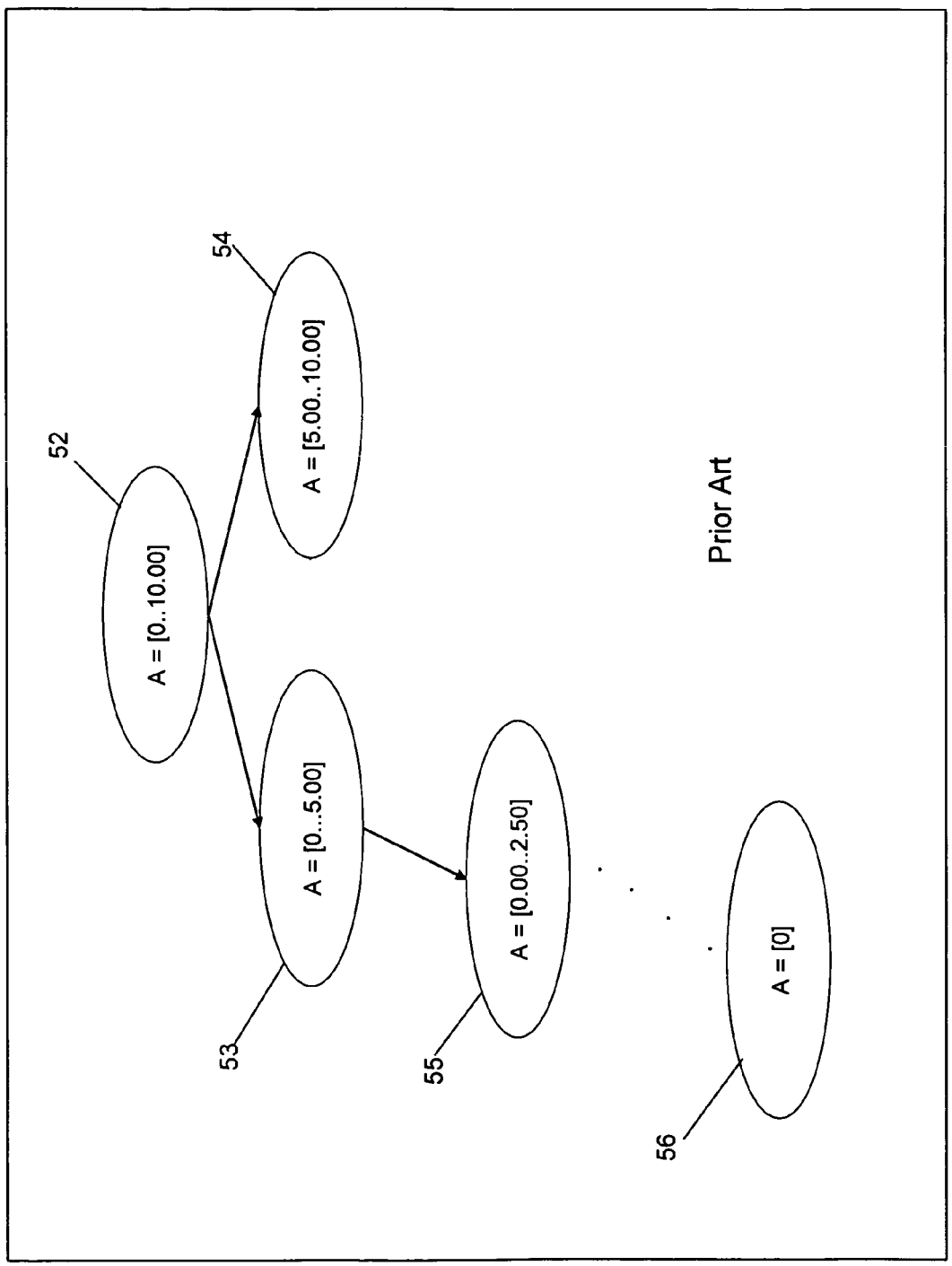
FIG. 2 illustrates one known method of domain splitting, referred to as "decreaseMax".

FIG. 2 illustrates one known method of domain splitting, referred to as "decreaseMax". DecreaseMax performs a dichotomic split towards the minimum value of the domain. As shown in the example of FIG. 2 at 52, a variable "A" initially has a floating point domain of [0 . . . 10.00]. The domain is split to [0 . . . 5.00] at 53 and [5.00 . . . 10.00] at 54. The split is an attempt to reduce the domain to a target range and then determine if it is consistent with the rest of the problem. If the target range is inconsistent, another range will be attempted. Otherwise, another split will be attempted over the current range. Therefore, if the decreased domain at 53 is consistent, it will be decreased again to [0 . . . 2.50] at 55, and so on, until the domain converges to 0 at 56. Another known method, referred to as "increaseMin" performs similar to decreaseMax except the dichotomic split is towards the maximum/increased value of the domain.

For float variables that are loosely constrained in the CSP, known domain splitting often ultimately causes a convergence to a boundary value. However, for float variables with large domains, converging to a fix point can be slow due to the number of splits required.

One embodiment optimizes the convergence at a domain boundary during domain splitting by attempting to assign the boundary value before performing the dichotomic splitting. Embodiments further optimize the convergence by assigning a specific predetermined value which through knowledge of the problem domain is known to be a desirable and likely successful assignment. For instance, in a configuration CSP problem, the weight or volume of a component can be represented as a float variable. For such a variable, the value 0.0 may mean that no quantity of the component appears in the configuration, which in a particular configuration problem may be known to be both desirable and usually feasible.

Figure 3:
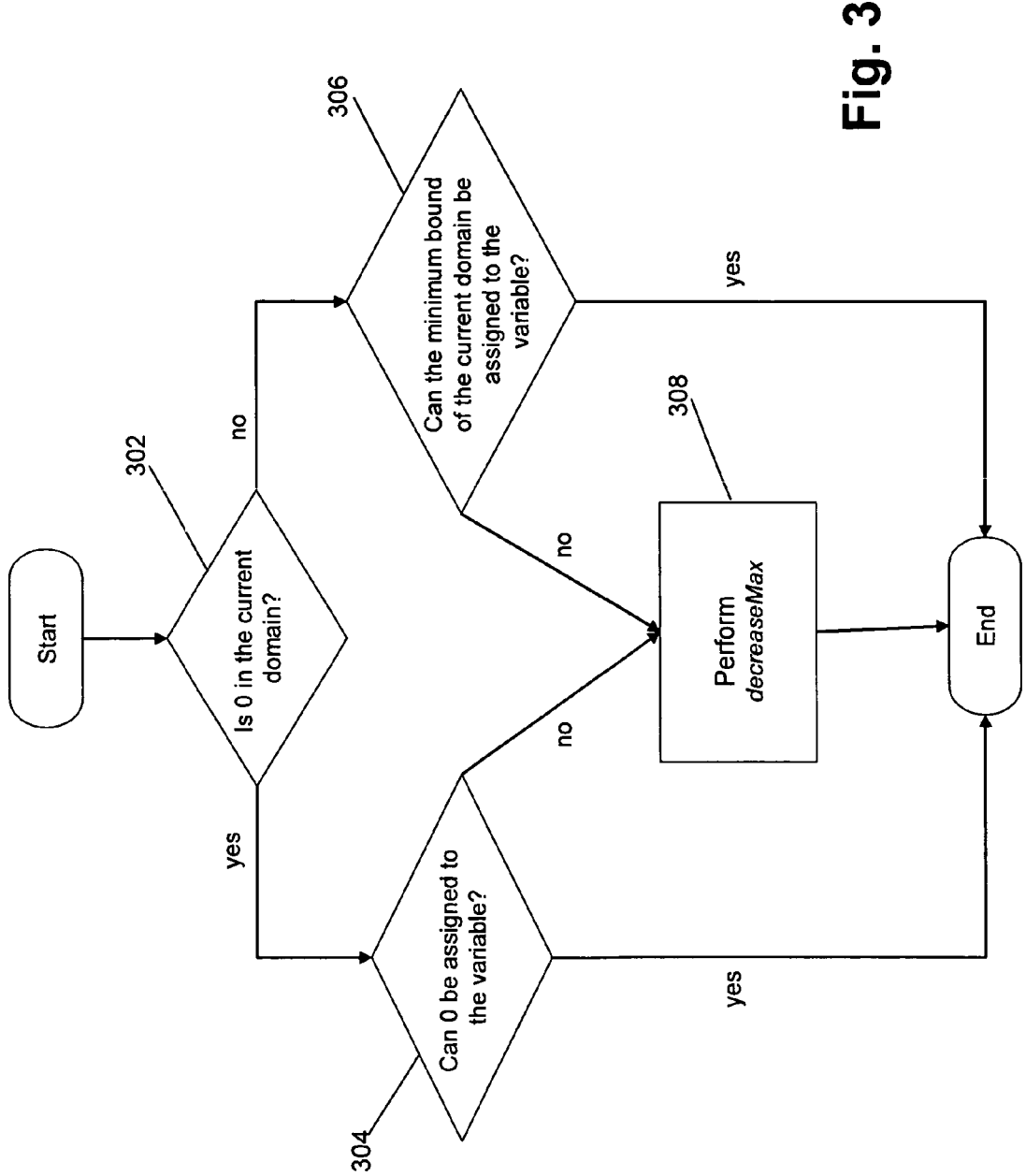
FIG. 3 is a flow diagram of the functionality of a constraint solver module when assigning a value to a variable having a floating point domain in a CSP in accordance with one embodiment.

FIG. 3 is a flow diagram of the functionality of constraint solver module 16 when assigning a value to a variable having a floating point domain in a CSP in accordance with one embodiment. In one embodiment, the functionality of the flow diagram of FIG. 3, and FIG. 4 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, it is determined if 0 (or another predetermined value) is within the current floating point domain of the variable. One example where a predetermined value other than 0 is used at 302 is a chemistry problem where the variable is a pH value. In that problem, a neutral pH value of 7.0 may be the best predetermined value when solving the problem. In general, the predetermined value is a value that is known to be preferred by users.

If yes at 302, at 304 it is determined if 0 can be assigned to the variable. If yes at 304, the functionality ends. A determination if a value can be assigned to a variable for 304, and for other functional blocks disclosed below, includes assigning the value to the variable and determining if it is consistent with the constraints that involve the variable. If it is consistent, the variable can be assigned the value.

If no at 302, at 306 it is determined if the minimum bound of the domain can be assigned to the variable. If yes at 306, the functionality ends.

If no at 304 or 306, a decreaseMax domain splitting, as disclosed in FIG. 2, is performed at 308 in order to find the next value in the domain to assign. However, because it has already been determined that 0 or the minimum bound are the most likely values for the variable, based on prior knowledge of user's preferred values, in many instances the functionality of 308 can be avoided.

Figure 4:
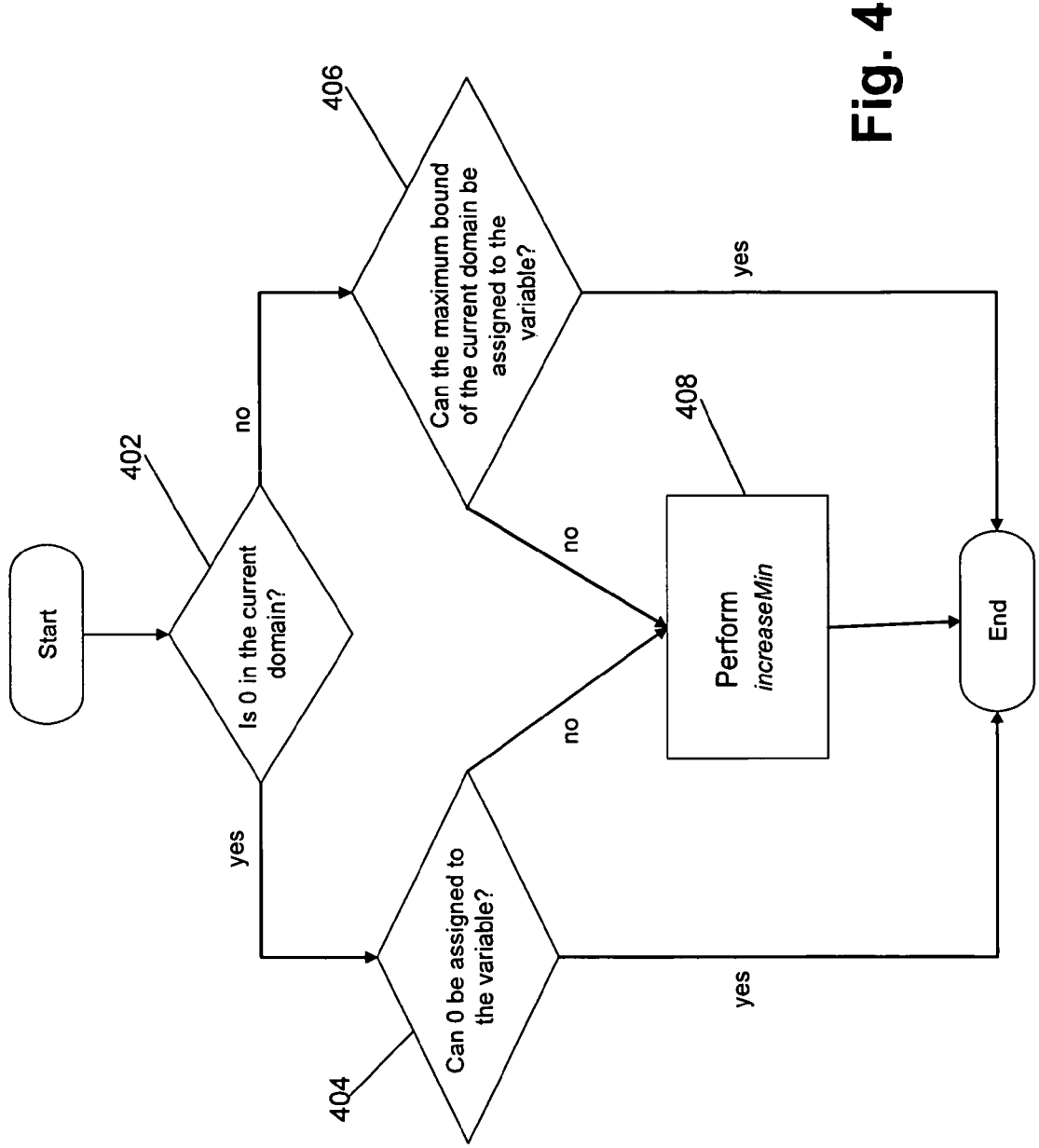
FIG. 4 is a flow diagram of the functionality of the constraint solver module when assigning a value to a variable having a floating point domain in a CSP in accordance with one embodiment.

FIG. 4 is a flow diagram of the functionality of constraint solver module 16 when assigning a value to a variable having a floating point domain in a CSP in accordance with one embodiment.

At 402, it is determined if 0 (or another predetermined value) is within the current floating point domain of the variable.

If yes at 402, at 404 it is determined if 0 can be assigned to the variable. If yes at 404, the functionality ends.

If no at 402, at 406 it is determined if the maximum bound of the domain can be assigned to the variable. If yes at 406, the functionality ends.

If no at 404 or 406, an increaseMin domain splitting is performed at 408 in order to find the next value in the domain to assign. However, because it has been determined that 0 or the maximum bound are the most likely values for the variable, based on prior knowledge of user's preferred values, in many instances the functionality of 408 can be avoided.

As disclosed, for CSP models that meet the criteria for applying such heuristic, solver 16 reaches a solution with a considerable reduction in the occurrences of domain splitting. This can result in faster performance in finding solutions. Embodiments provide optimized assignment of floating point variables in CSP models for which the numeric value 0.0, or some other preferred value, has an implicit meaning, or in models for which the float variables are loosely constrained.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to assign a value to a first floating point variable of a constraint satisfaction problem that comprises a plurality of variables and a plurality of constraints, wherein the first floating point variable has a first domain, the instructions comprising:

determining if a predetermined value can be assigned to the first floating point variable if the predetermined value is in the first domain;

if the predetermined value is not in the first domain, determining if a first bound of the first domain can be assigned to the first floating point variable; and assigning the value of the first floating point variable using domain splitting if the predetermined value cannot be assigned to the first floating point variable and the first bound of the first domain cannot be assigned to the first floating point variable.

2. The computer readable medium of claim 1, wherein the predetermined value is 0.

3. The computer readable medium of claim 2, wherein the constraint satisfaction problem comprises a product configurator.

4. The computer readable medium of claim 1, wherein the predetermined value is based on a determination of a user's preferred value for the first floating point variable.

5. The computer readable medium of claim 1, wherein the first bound of the first domain is a minimum bound and the domain splitting is a decreaseMax.

6. The computer readable medium of claim 1, wherein the first bound of the first domain is a maximum bound and the domain splitting is an increaseMin.

7. A computer implemented method for assigning a value to a first floating point variable of a constraint satisfaction problem that comprises a plurality of variables and a plurality of constraints, wherein the first floating point variable has a first domain, the instructions comprising:

determining by a processor if a predetermined value is within a first domain of the first floating point variable;

determining by the processor if the predetermined value can be assigned to the first floating point variable if the predetermined value is in the first domain; if the predetermined value is not in the first domain, determining if a first bound of the first domain can be assigned to the first floating point variable; and assigning by the processor the value of the first floating point variable using domain splitting if the predetermined value can not be assigned to the first floating point variable and the first bound of the first domain can not be assigned to the first floating point variable.

8. The computer implemented method of claim 7, wherein the constraint satisfaction problem comprises a product configurator.

9. The computer implemented method of claim 7, wherein the predetermined value is based on a determination of a user's preferred value for the first floating point variable.

10. The computer implemented method of claim 7, wherein the first bound of the first domain is a minimum bound and the domain splitting is a decreaseMax.

11. The computer implemented method of claim 7, wherein the first bound of the first domain is a maximum bound and the domain splitting is an increaseMin.

12. A constraint satisfaction problem solver comprising:

a stored predetermined value for a first floating point domain;

a determining module that determines if a predetermined value is within a first domain of a first floating point variable, and if the predetermined value can be assigned to the first floating point variable if the predetermined value is in the first floating point domain;

wherein the determining module, if the predetermined value is not within the first floating point domain, further determines if a first bound of the first floating point domain can be assigned to the first floating point variable;

an assigning module that assigns the value of the first floating point variable using domain splitting if the predetermined value can not be assigned to the first floating point variable and the first bound of the first floating point domain can not be assigned to the first floating point variable; and a processor coupled to a non-transitory computer readable medium having instructions stored thereon that when executed by the processor causes the processor to implement the determining module and the assigning module.

13. The constraint satisfaction problem solver of claim 12, wherein the solved problem is a product configurator.

14. The constraint satisfaction problem solver of claim 12, wherein the first bound of the first floating point domain is a minimum bound and the domain splitting is a decreaseMax.

15. The constraint satisfaction problem solver of claim 12, wherein the first bound of the first floating point domain is a maximum bound and the domain splitting is an increaseMin.

16. The method of claim 7, wherein the predetermined value is 0.

17. The solver of claim 12, wherein the predetermined value is 0.

18. The solver of claim 12, wherein the predetermined value is based on a determination of a user's preferred value for the first floating point variable.

* * * * *

UNITED STATES PATENT AND TRADEMARK OFFICE
CERTIFICATE OF CORRECTION

PATENT NO.          : 8,229,870 B2
APPLICATION NO.     : 12/431096
DATED               : July 24, 2012
INVENTOR(S)         : Bagley et al.

It is certified that error appears in the above-identified patent and that said Letters Patent is hereby corrected as shown below:

On Title Page 2, Item (56), 2$^{nd}$ column, under "Other Publications", line 2, delete "Artifical" and insert -- Artificial --, therefor.

Signed and Sealed this
Sixth Day of November, 2012

David J. Kappos
*Director of the United States Patent and Trademark Office*